United States Patent
Cassidy, II (10) Patent No.: US 11,247,335 B2
(45) Date of Patent: Feb. 15, 2022

(54) SEMI-AUTONOMOUS ROBOT PATH PLANNING

(71) Applicant: Caterpillar Inc., Deerfield, IL (US)

(72) Inventor: Robert Kimball Cassidy, II, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 143 days.

(21) Appl. No.: 16/515,851

(22) Filed: Jul. 18, 2019

(65) Prior Publication Data
US 2021/0016440 A1    Jan. 21, 2021

(51) Int. Cl.
*B25J 9/16* (2006.01)

(52) U.S. Cl.
CPC ........... *B25J 9/1664* (2013.01); *B25J 9/1697* (2013.01)

(58) Field of Classification Search
CPC ...... B25J 9/1661; B25J 9/1664; B25J 9/1697; B25J 9/1684; B25J 9/1687
See application file for complete search history.

(56) References Cited

U.S. PATENT DOCUMENTS

| | | | |
|---|---|---|---|
| 6,445,979 B1 * | 9/2002 | Inoue | B25J 9/1684 318/565 |
| 9,547,945 B2 | 1/2017 | McCabe et al. | |
| 9,796,085 B2 | 10/2017 | Richter et al. | |
| 2003/0078694 A1 * | 4/2003 | Watanabe | G05B 19/4202 700/245 |
| 2004/0011284 A1 * | 1/2004 | Schucker | B25J 19/023 118/688 |
| 2008/0027580 A1 * | 1/2008 | Zhang | B25J 9/1664 700/245 |
| 2011/0153338 A1 | 6/2011 | Anderson | |
| 2014/0081459 A1 | 3/2014 | Dubois et al. | |
| 2015/0105908 A1 * | 4/2015 | Ivanov | B25J 9/1697 700/259 |
| 2018/0057283 A1 | 3/2018 | Peters et al. | |

FOREIGN PATENT DOCUMENTS

| | | |
|---|---|---|
| CA | 3002911 A1 | 4/2017 |
| CN | 201659565 U | 12/2010 |

* cited by examiner

*Primary Examiner* — Khoi H Tran
*Assistant Examiner* — Nhi Q Bui
(74) *Attorney, Agent, or Firm* — Harrity & Harrity LLP (57) ABSTRACT

A robot controller is disclosed. The robot controller may include one or more processors, communicatively coupled to the one or more memories, configured to: receive, from a vision sensor, an image of a path marker disposed on a workpiece, the path marker having a work path identifier corresponding to a work path to be traced by a robot end effector; determine, using a computer vision model, the work path based on the image, the computer vision model having been trained to detect the work path identifier and identify the work path based on the work path identifier; determine a set of coordinates within a workspace of the robot end effector based on the work path; generate a work path instruction to guide the robot end effector according to the set of coordinates; and cause the robot end effector to operate according to the work path instruction.

20 Claims, 4 Drawing Sheets

SEMI-AUTONOMOUS ROBOT PATH PLANNING

TECHNICAL FIELD

The present disclosure relates generally to industrial robots and, for example, to semi-autonomous robot path planning.

BACKGROUND

Industrial robots refer to automated and programmable robot systems capable of movement about one or more axes. Characterized by high endurance, speed, and precision, industrial robots can be specialized to weld, paint, assemble, pick and place, package, label, palletize, test, or perform another manufacturing process. For instance, a welding robot can be programmed to automate many of the processes associated with a weld operation, such as handling a workpiece to be welded and performing the weld. A welding robot generally includes a manipulator (e.g., an articulated arm), an end effector (e.g., a welding tool), and a robot controller. The manipulator enables the robot to move the end effector to a desired position and/or orientation, and the robot controller controls the manipulator and the end effector according to instructions programmed by an operator.

Although industrial robots can facilitate a manufacturing process, there is still room for improvement. For instance, a welding robot may facilitate a weld operation, but the process of programming the welding robot can be tedious and time consuming. The programming is typically done offline (e.g., within a workstation that is disconnected from the welding robot) to allow the welding robot to be used for other projects in the meantime and to maintain productivity. Moreover, the offline programming is performed within an environment that simulates an actual workspace of the welding robot. As such, the success of the weld operation relies heavily on proper calibration between the simulated environment and the actual workspace, the accuracy of the programmed instructions input by an operator, and other factors. An error in the calibration and/or in the program may result in an incorrect weld, damage to the workpiece, damage to the robot system, and/or the like.

One attempt to facilitate path planning for an industrial robot is disclosed in U.S. Pat. No. 9,547,945 that issued to McCabe, et al. on Jan. 17, 2017 ("the '945 patent"). In particular, the '945 patent discloses a guidance and navigation system that may be used to determine a path for a vehicle, sense environmental conditions outside the vehicle, and operate a propulsion drive system to guide the vehicle along the defined path. The '945 patent discloses using video cameras or laser scanners to detect fiducials that are placed periodically along various paths in a warehouse. Each fiducial has a unique appearance or an optically readable code enabling the guidance and navigation system to determine the present position of the vehicle and the direction to take to reach the next fiducial. While the '945 patent may help navigate a robot, the '945 patent does not disclose path planning that additionally programs a robot for specific and complex industrial tasks, such as weld operations.

A robot system of the present disclosure solves one or more of the problems set forth above and/or other problems in the art.

SUMMARY

According to some implementations, a method may include receiving, by a device and from a vision sensor, an image of a path marker disposed on a workpiece, the path marker having a work path identifier corresponding to a work path to be traced by a robot end effector and a task identifier corresponding to a task to be performed by the robot end effector; determining, by the device and using a computer vision model, the work path and the task based on the image, the computer vision model having been trained to detect the work path identifier and the task identifier, identify the work path based on the work path identifier, and identify the task based on the task identifier; determining, by the device, a set of coordinates within a workspace of the robot end effector based on the work path; generating, by the device, a work path instruction to guide the robot end effector according to the set of coordinates; generating, by the device, a task instruction to perform the task corresponding to the task identifier as the robot end effector is guided according to the set of coordinates; and causing, by the device, the robot end effector to operate according to the work path instruction and the task instruction.

According to some implementations, a robot controller may include one or more processors, communicatively coupled to the one or more memories, configured to: receive, from a vision sensor, an image of a path marker disposed on a workpiece, the path marker having a work path identifier corresponding to a work path to be traced by a robot end effector; determine, using a computer vision model, the work path based on the image, the computer vision model having been trained to detect the work path identifier and identify the work path based on the work path identifier; determine a set of coordinates within a workspace of the robot end effector based on the work path; generate a work path instruction to guide the robot end effector according to the set of coordinates; and cause the robot end effector to operate according to the work path instruction According to some implementations, a system may include a robot configured to movably support an end effector; a positioner configured to movably support a workpiece within a workspace of the robot; a vision sensor configured to capture an image of the workspace and a path marker disposed on the workpiece; and a robot controller in communication with the robot, the end effector, the positioner, and the vision sensor, the robot controller being configured to: receive the image of the path marker from the vision sensor, detect a work path identifier and a task identifier based on the image, identify a work path to be traced by the end effector based on the work path identifier, identify a task to be performed by the end effector based on the task identifier, determine a set of coordinates within the workspace based on the work path, generate a work path instruction to guide the end effector according to the set of coordinates, generate a task instruction to perform the task corresponding to the task identifier, and cause the robot and the end effector to operate according to the work path instruction and the task instruction.

DETAILED DESCRIPTION

Figure 1:
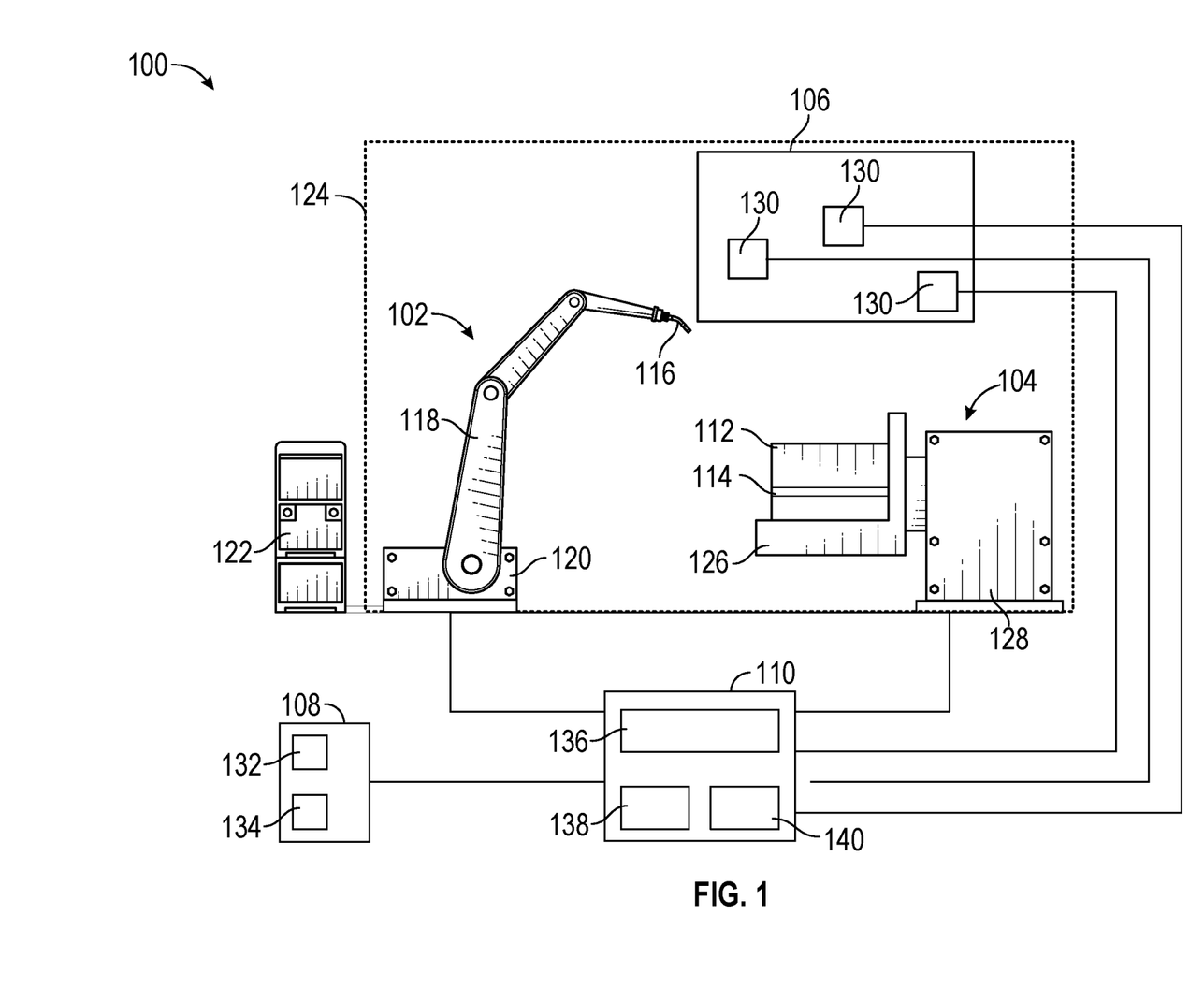
FIG. 1 is a diagram of an example robot system described herein.

FIG. 1 is a diagram of an example robot system 100 described herein. As shown in FIG. 1, robot system 100 includes a robot 102, a positioner 104, a vision system 106, a user interface device 108, and a robot controller 110 in communication with robot 102, positioner 104, vision system 106, and user interface device 108. Robot system 100 may be configured to semi-autonomously plan a work path for a weld operation (e.g., welding two or more parts of a workpiece 112 made of a metal and/or another suitable substrate) according to a path marker 114 disposed on workpiece 112. In some examples, robot system 100 may be configured to perform a task associated with another process (e.g., painting, assembling, picking and placing, packaging, labeling, palletizing, testing, and/or the like). Robot system 100 may include multiple robots 102, multiple positioners 104, multiple vision systems 106, multiple user interface devices 108, and/or multiple robot controllers 110. Robot controller 110 may be configured to operate with a particular robot system, and/or configured to universally operate with different types of robot systems.

Robot 102 includes an end effector 116, a manipulator 118, and a base 120. End effector 116 may include a tool appropriate for a task to be performed by robot 102. For example, in a weld operation, end effector 116 may include a welding tool (e.g., a torch assembly, a wire feed mechanism, and/or the like) that is powered by power source 122 (e.g., a welding power source). Manipulator 118 may include an articulated arm that pivotally couples end effector 116 to base 120. Base 120 may rotatably support end effector 116 and manipulator 118 within a workspace 124. Manipulator 118 and/or base 120 may enable end effector 116 to move about one or more axes within a coordinate system of workspace 124. A pose (e.g., a position and/or an orientation) of end effector 116 may be automatically controlled (e.g., via robot controller 110) and/or manually controlled by an operator (e.g., via user interface device 108 and/or the like). In some cases, end effector 116 may remain stationary while positioner 104 causes workpiece 112 to move relative to end effector 116.

Positioner 104 includes a support member 126 and a base 128. Support member 126 may include a jig, a guide, a clamp, and/or another mechanism for fastening workpiece 112 on support member 126. Support member 126 may be rotatable or otherwise movable about one or more axes relative to base 128 and workspace 124 to enable workpiece 112 to be positioned in a particular pose relative to robot 102. Positioner 104 may be programmed (e.g., via robot controller 110) to hold and/or adjust a pose of workpiece 112 and/or manually operated by an operator (e.g., via user interface device 108) to hold and/or adjust a pose of workpiece 112. Robot 102 and positioner 104 may be caused to move simultaneously during an operation to facilitate access to workpiece 112 by robot 102. In some cases, positioner 104 may remain stationary while robot 102 is caused to move relative to workpiece 112.

Vision system 106 includes a vision sensor 130 that is positioned within the workspace 124 and configured to capture one or more images of path marker 114. For example, vision sensor 130 may include a camera, an infrared sensor, a radar sensor, a lidar sensor, and/or the like.

Vision system 106 may use a single vision sensor 130 to capture multiple images and/or a video of path marker 114 (e.g., to capture multiple perspectives of path marker 114 as workpiece 112 is caused to rotate or otherwise move by positioner 104). In some implementations, vision system 106 may use a plurality of vision sensors 130, each positioned at a different location within workspace 124 and having a field of vision directed at path marker 114 to capture a different perspective of path marker 114. The position of vision sensor 130 relative to workspace 124 and/or a field of view of vision sensor 130 may be automatically adjusted (e.g., via robot controller 110) and/or manually adjusted by an operator (e.g., via user interface device 108).

Vision system 106 may be configured to spatially map a pose of path marker 114 within workspace 124 based on an image of path marker 114. For example, vision system 106 may map a sensor coordinate system of vision sensor 130 (e.g., a pixel coordinate system of a camera and/or the like) with a coordinate system of workspace 124 such that path marker 114 captured in an image can be located within workspace 124. In some examples, vision system 106 may be configured to capture an image of path marker 114 and one or more reference markers within workspace 124. Reference markers may be visually detectable and fixed at known positions within workspace 124 and/or movable between known positions within workspace 124 (e.g., disposed on robot 102 and/or positioner 104). Vision system 106 may locate path marker 114 within workspace 124 based on the image and a relative position between path marker 114 and one or more reference markers captured within the image. In some cases, vision system 106 may use multiple vision sensors 130 and a triangulation technique to locate path marker 114. Additionally, or alternatively, robot controller 110 may spatially map an image captured by vision system 106.

User interface device 108 includes an input device 132 and an output device 134 enabling an operator to interact with robot 102 and/or positioner 104. For example, input device 132 may include one or more of a touchscreen, a joystick, a pendant, a dial, a keypad, a keyboard, a mouse, and/or another input device. Output device 134 may include one or more of a touchscreen, a monitor, a speaker, and/or another output device. User interface device 108 may enable an operator to input a program (e.g., a set of instructions and/or commands) to robot controller 110 for operating robot 102, end effector 116, and/or positioner 104. User interface device 108 may display a program to an operator, and enable the operator to edit, modify, and/or confirm the program prior to executing the program on robot 102 and/or positioner 104. In some examples, user interface device 108 may provide a simulation result corresponding to the program. Additionally, or alternatively, user interface device 108 may provide information relating to a task (e.g., a weld operation) in progress.

Robot controller 110 includes a processor 136, a memory 138, and a communication device 140. Processor 136 is implemented in hardware, firmware, and/or a combination of hardware and software capable of being programmed to perform a function associated with robot 102 (e.g., perform path planning for a weld operation, perform a weld operation, and/or the like). Memory 138 includes a random-access memory (RAM), a read only memory (ROM), and/or another type of dynamic or static storage device that stores information and/or instructions to be performed by processor 136. Communication device 140 includes a local area network (LAN) component, a wireless local area network (WLAN) component (e.g., a Wi-Fi component, a Bluetooth component, and/or the like), a radio frequency (RF) component, and/or the like. Communication device 140 may enable communication between robot controller 110 and one or more of robot 102, end effector 116, power source 122, positioner 104, vision system 106, user interface device 108, an offline programming device, and/or the like.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) of FIG. 1 may perform one or more functions described as being performed by another set of devices of FIG. 1.

Figure 2:
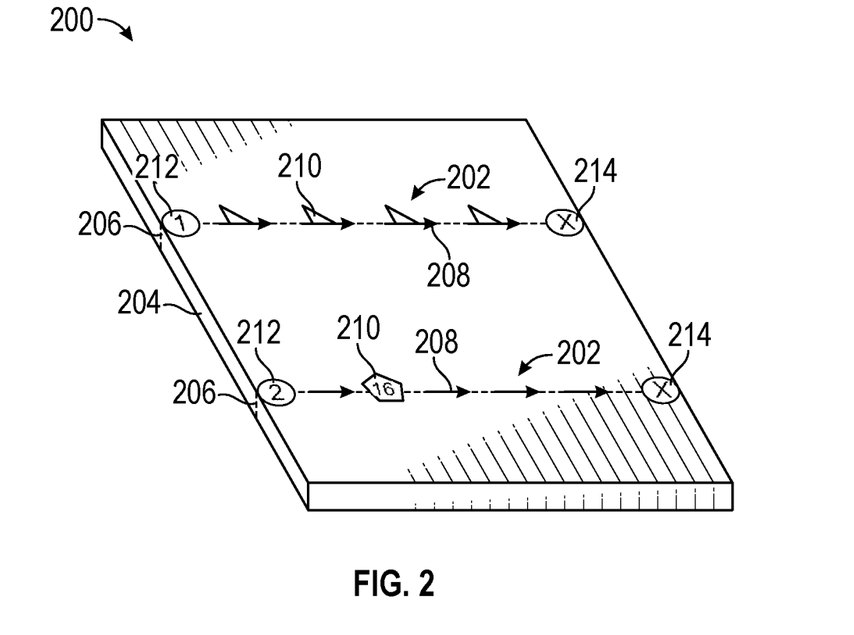
FIG. 2 is a diagram of an example implementation of a path marker used in association with a robot system described herein.

FIG. 2 is a diagram of an example implementation 200 of a path marker 202 used in association with robot system 100 described herein. Path marker 202 may be applied to a workpiece 204 (e.g., printed, painted, laser-etched, cast-formed, handwritten, and/or the like) along a desired work path (e.g., a seam 206 between two or more parts of workpiece 204 to be welded). Path marker 202 may include an attribute (e.g., a symbol, an alphanumeric character, a barcode, a quick response (QR) code, and/or the like) that is visually recognizable by vision system 106 and indicative of a task to be performed. For example, path marker 202 may include a work path identifier 208 corresponding to a work path to be traced by end effector 116, and a task identifier 210 corresponding to a task to be performed by end effector 116. For a weld operation, work path identifier 208 may correspond to a location and/or a direction of the weld to be applied. Task identifier 210 may correspond to a weld type (e.g., a fillet weld, a butt weld, a lap weld, a groove weld, a bevel weld, and/or the like). In some examples, task identifier 210 may be provided using a standardized symbol and/or annotation commonly used in association with a weld operation. Additionally, or alternatively, task identifier 210 may include reference to a weld size, a weave pattern, a wire feed speed, an end effector speed, and/or another weld parameter, and/or to a preset weld schedule (e.g., a set of weld parameters). Additional details regarding work path identifier 208 and task identifier 210 are provided with respect to FIGS. 4 and 5.

Path marker 202 may be segmented by a start point identifier 212 and/or an end point identifier 214. Start point identifier 212 for a weld operation may correspond to a point on workpiece 204 at which robot 102 is to position end effector 116 prior to welding or begin welding. End point identifier 214 for a weld operation may correspond to a point on workpiece 204 at which end effector 116 is to stop welding or depart from workpiece 204. In some cases, end point identifier 214 may correspond to a point at which robot 102 is to move end effector 116 to another start point identifier 212 on workpiece 204 or return end effector 116 to a home position (e.g., a default position, a safe position, and/or the like). Start point identifier 212 and/or end point identifier 214 may include a symbol, an alphanumeric character, and/or the like that is visually recognizable by vision system 106 and indicative of a sequence by which end effector 116 is to perform the associated task relative to another path marker 202 on workpiece 204.

As indicated above, FIG. 2 is provided as an example. Other examples may differ from what was described in connection with FIG. 2.

Figure 3:
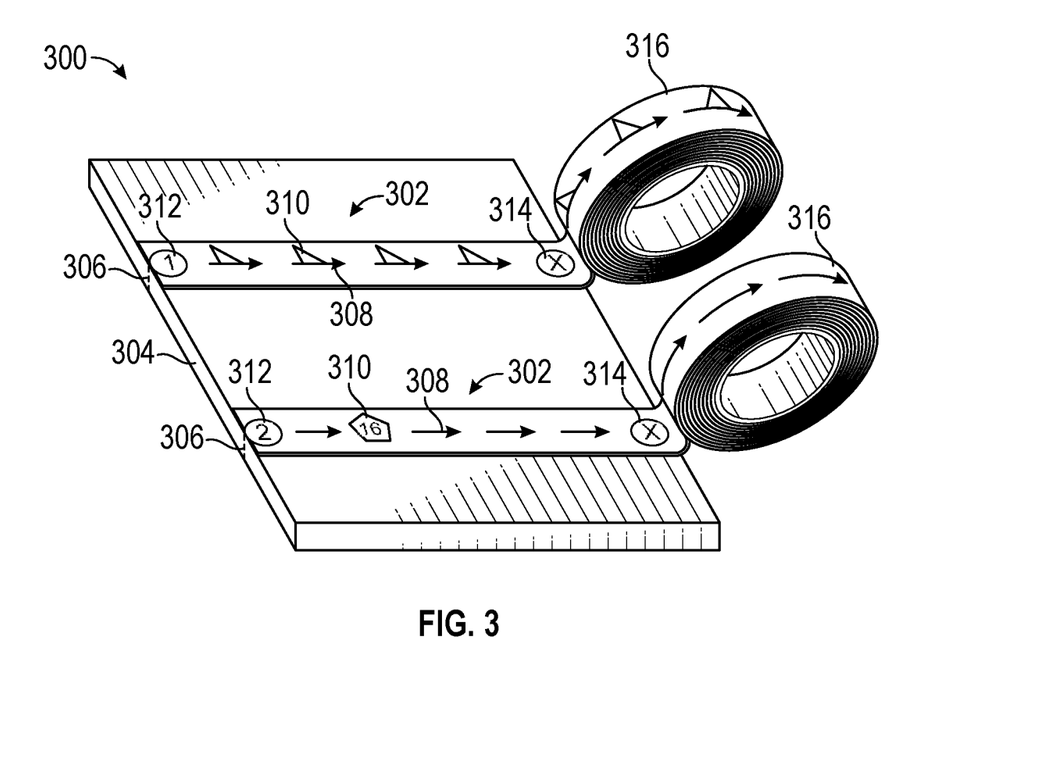
FIG. 3 is a diagram of an example implementation of a path marker used in association with a robot system described herein.

FIG. 3 is a diagram of another example implementation 300 of a path marker 302 used in association with robot system 100 described herein. Path marker 302 may be applied to a workpiece 304 and include an attribute (e.g., a work path identifier 308, a task identifier 310, a start point identifier 312, and/or an end point identifier 314), similar to path marker 202 of FIG. 2 described above. In contrast to path marker 202, path marker 302 of FIG. 3 may be provided in the form of an adhesive 316 that is placed on workpiece 304 and over the desired work path (e.g., a seam 306 between two or more parts of workpiece 304 to be welded). As shown for the example in FIG. 3, adhesive 316 may be provided as a tape having a series of work path identifiers 308, task identifiers 310, start point identifiers 312, end point identifiers 314, and/or the like. In some examples, adhesive 316 may be provided in the form of individual adhesives or stickers, each corresponding to one of a work path identifier 308, a task identifier 310, a start point identifier 312, an end point identifier 314, and/or the like.

Adhesive 316 may be reflective, colored, coated, treated, and/or otherwise designed to be visually distinct from a surface of workpiece 304 and recognizable by vision system 106. Additionally, or alternatively, adhesive 316 may be removable and/or consumable. For a weld operation, adhesive 316 may be formed of a material that is designed to be melted, dissolved, peeled, burned, and/or otherwise removed from workpiece 304 during the weld operation (e.g., upon application of a torch of end effector 116). In some examples, adhesive 316 may be formed to include a welding wire that is configured to melt during the weld operation to produce a weld (e.g., upon application of a torch of end effector 116). A series of work path identifiers 308, task identifiers 310, start point identifiers 312, end point identifiers 314, and/or the like may be pre-printed on adhesive 316. In some examples, an operator may print a particular combination of work path identifiers 308, task identifiers 310, start point identifiers 312, end point identifiers 314, and/or the like on a blank form of adhesive 316.

As indicated above, FIG. 3 is provided as an example. Other examples may differ from what was described in connection with FIG. 3.

Figure 4:
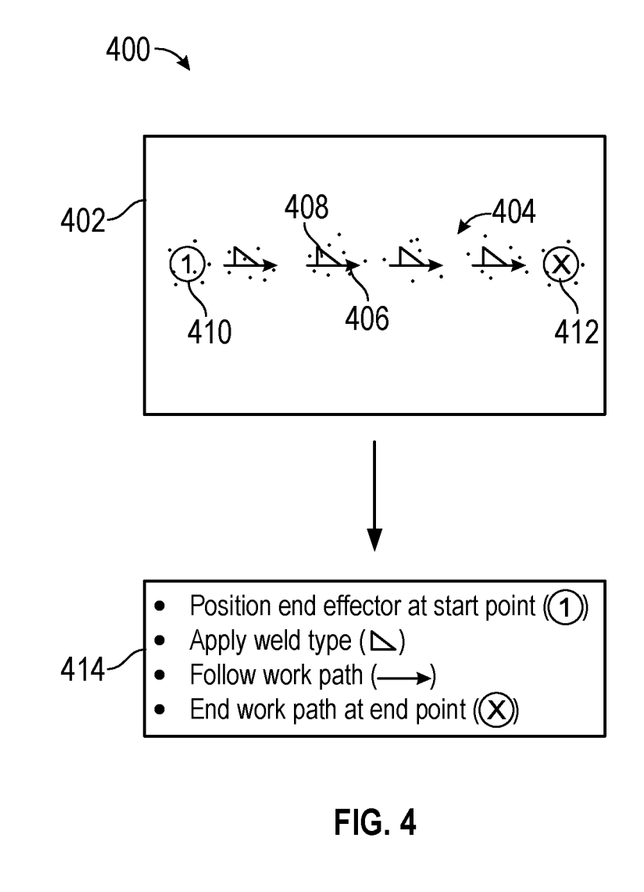
FIG. 4 is a diagram of an example implementation of a robot system described herein.

FIG. 4 is a diagram of an example implementation 400 of robot system 100 described herein. As shown in FIG. 4, an image 402 of a path marker 404 may be captured by vision system 106. Robot controller 110 may receive image 402 from vision system 106 and use image 402 to plan a task (e.g., a weld operation) to be performed by robot 102 and end effector 116 on workpiece 112. Similar to prior examples, path marker 404 may include a work path identifier 406, a task identifier 408, a start point identifier 410, an end point identifier 412, and/or another indicator corresponding to a parameter of a task to be performed (e.g., a weld parameter for a weld operation). Robot controller 110 may receive multiple images of different perspectives of path marker 404 captured by multiple vision sensors 130 of vision system 106. Additionally, or alternatively, robot controller 110 may receive multiple images and/or a video of path marker 404 (e.g., as workpiece 112 is caused to move by positioner 104).

Robot controller 110 may determine a work path and a corresponding task to be performed by end effector 116 based on image 402. Robot controller 110 may use image 402 and/or other information provided by vision system 106 to determine the work path and the corresponding task. In some examples, robot controller 110 may use a computer vision model and/or another type of image-based analytic model to visually detect and identify attributes of path marker 404 captured in image 402. The computer vision model may be trained with reference information (e.g., visual traits relating to different possible variations of path marker 404 that may be used and/or different possible attributes that path marker 404 may include). The computer vision model may be trained to visually recognize path marker 404 and/or attributes of path marker 404 by matching visual traits within image 402 to the reference information.

The computer vision model may be trained to distinguish between path marker 404 and workpiece 112 based on a visually recognizable contrast (e.g., a change in tone, color, brightness, and/or the like) between one or more pixels within image 402. The computer vision model may be trained to distinguish between different attributes of path marker 404 (e.g., work path identifier 406, task identifier 408, start point identifier 410, end point identifier 412, and/or the like) based on a visually recognizable pattern in image 402. For example, the computer vision model may be trained to associate a visual pattern with an attribute of path marker 404 based on reference to a data structure and/or the like which stores a plurality of reference patterns and respective attributes. The computer vision model may be trained and used by robot controller 110, trained by another device (e.g., a server device, a cloud computing device, and/or the like) and used by robot controller 110, and/or trained by robot controller 110 and used by another device.

The computer vision model may be trained to associate work path identifier 406 in image 402 with one of a plurality of reference work path identifiers (e.g., stored in a data structure and/or the like). Each reference work path identifier may be associated with a respective travel direction for end effector 116. As shown for the example in FIG. 4, work path identifier 406 may include a symbol (e.g., an arrow) directing end effector 116 along a work path extending from start point identifier 410 to end point identifier 412. Work path identifier 406 may include a plurality of arrows which collectively define a work path. The computer vision model may be trained to detect the arrow, identify the arrow as work path identifier 406, and enable robot controller 110 to determine a continuous work path for end effector 116 to trace based on work path identifier 406. In some examples, the computer vision model may associate another symbol, an alphanumeric character, a barcode, a QR code, and/or the like with work path identifier 406.

The computer vision model may be trained to associate task identifier 408 in image 402 with one of a plurality of reference task identifiers (e.g., stored in a data structure and/or the like). Each reference task identifier may be associated with a respective parameter (e.g., a weld parameter) of the task to be performed by end effector 116, a respective weld type, and/or a respective preset weld schedule (e.g., a set of weld parameters including a weld type, a weld size, a weave pattern, a wire feed speed, an end effector speed, and/or the like). As shown for the example in FIG. 4, task identifier 408 may include a symbol (e.g., a right triangle) indicating a weld type or a task for end effector 116 to perform. In some examples, task identifier 408 may be provided using a standardized symbol and/or annotation commonly used in association with a weld operation. The computer vision model may be trained to detect the right triangle, identify the right triangle as task identifier 408, and enable robot controller 110 to determine the corresponding weld type or task for end effector 116 to perform. In some examples, the computer vision model may associate another symbol, an alphanumeric character, a barcode, a QR code, and/or the like with task identifier 408.

The computer vision model may be trained to distinguish start point identifier 410 and end point identifier 412 from other attributes of path marker 404 based on a visually recognizable pattern in image 402. As shown for the example in FIG. 4, the computer vision model may detect a symbol (e.g., a circle) and associate the symbol with start point identifier 410 and/or end point identifier 412. The computer vision model may distinguish between start point identifier 410 and end point identifier 412 based on a label (e.g., an alphanumeric character and/or the like) associated with the symbol. In the example shown, the computer vision model may be trained to detect and identify the circle with the numeric label as start point identifier 410, detect and identify the circle with the non-numeric label as end point identifier 412, and enable robot controller 110 to determine corresponding start and end points of the work path. Furthermore, if more than one path marker 404 is provided, robot controller 110 may determine a sequence by which to perform the associated task relative to another path marker 404 based on the numeric label of start point identifier 410.

Robot controller 110 may determine a set of coordinates within workspace 124 based on a work path identified by path marker 404. Robot controller 110 may use the computer vision model to spatially map a pixel coordinate system of vision system 106 with a coordinate system of workspace 124, and use the mapped pixel coordinates to determine coordinates for guiding end effector 116. For example, pixel coordinates of start point identifier 410 and/or end point identifier 412 in image 402 can be converted into three-dimensional coordinates corresponding to a location of start point identifier 410 and/or a location of end point identifier 412 within workspace 124. Robot controller 110 may similarly determine a set of coordinates corresponding to a location of work path identifier 406 and/or a location of task identifier 408, and interpolate the coordinates associated with work path identifier 406, task identifier 408, start point identifier 410, and/or end point identifier 412 to determine the work path. Additionally, or alternatively, vision system 106 may be used to spatially map the pixel coordinate system with a coordinate system of workspace 124.

As further shown in FIG. 4, robot controller 110 may generate an instruction, a command, and/or a program 414 of instructions and/or commands based on path marker 404. For example, based on attributes of path marker 404 determined from image 402, robot controller 110 may generate a work path instruction that can be used to guide robot 102 and end effector 116 during the operation. In particular, a work path instruction may instruct robot 102 to position end effector 116 at a start point (e.g., a corresponding location of start point identifier 410), and follow a work path (e.g., a corresponding location of work path identifier 406), and/or depart from workpiece 112 at an end point (e.g., a corresponding location of end point identifier 412). A work path instruction may instruct robot 102 to move end effector 116 to a start point of another work path (e.g., according to a sequence identified by start point identifier 410). In some examples, a work path instruction may instruct robot 102 to return to a home position after completing a work path and/or prior to beginning another work path.

Robot controller 110 may generate a task instruction that instructs end effector 116 to perform a particular task along a work path and/or at a corresponding location of task identifier 408. As shown for the example in FIG. 4, program 414 may include a task instruction to apply a particular weld type corresponding to the symbol (e.g., right triangle) of task identifier 408 captured in image 402. The weld type may be selected from a plurality of preset weld types (e.g., a fillet weld, a butt weld, a lap weld, a groove weld, a bevel weld, and/or the like), instructions for which may be stored in a data structure and/or the like. Additionally, or alternatively, task identifier 408 may be indicative of a set of weld parameters (e.g., a combination of a weld type, a weld size, a weave pattern, a wire feed speed, an end effector speed, and/or the like). A task instruction may instruct end effector 116 to begin the specified task (e.g., weld operation) at a corresponding location of start point identifier 410 and/or end the task at a corresponding location of end point identifier 412. In some cases, a task instruction may instruct end effector 116 to begin the task at a corresponding location of a first instance of task identifier 408 and/or end the task at a corresponding location of a final instance of task identifier 408.

As indicated above, FIG. 4 is provided as an example. Other examples may differ from what was described in connection with FIG. 4.

Figure 5:
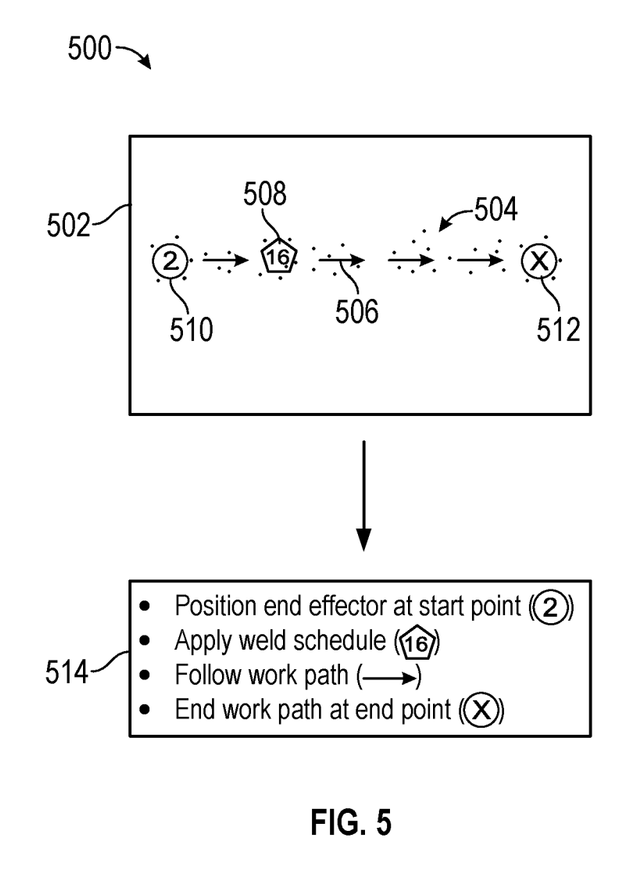
FIG. 5 is a diagram of an example implementation of a robot system described herein.

FIG. 5 is a diagram of an example implementation 500 of robot system 100 described herein. Similar to examples described above, robot controller 110 may receive an image 502 of a path marker 504 captured by vision system 106 and use image 502 to plan a task (e.g., a weld operation) to be performed by robot 102 and end effector 116. Path marker 504 may include a work path identifier 506, a task identifier 508, a start point identifier 510, an end point identifier 512, and/or another indicator corresponding to a parameter of a task to be performed (e.g., a weld parameter for a weld operation). As previously described, robot controller 110 may use a computer vision model to visually detect and identify attributes of path marker 504 captured in image 502. For example, the computer vision model may be trained to distinguish between different attributes of path marker 504 (e.g., work path identifier 506, task identifier 508, start point identifier 510, end point identifier 512, and/or the like) based on a visually recognizable pattern in image 502.

As shown for the example in FIG. 5, work path identifier 506 may include a symbol (e.g., an arrow) directing end effector 116 along a work path extending from start point identifier 510 to end point identifier 512. Work path identifier 506 may include a plurality of arrows which collectively define a work path. The computer vision model may be trained to detect the arrow, identify the arrow as work path identifier 506, and enable robot controller 110 to determine a continuous work path for end effector 116 to trace based on work path identifier 506. As also shown for the example in FIG. 5, task identifier 508 may include a labeled symbol (e.g., a labeled pentagon) indicating a task for end effector 116 to perform. The computer vision model may be trained to detect the labeled pentagon, identify the labeled pentagon as task identifier 508, and enable robot controller 110 to determine the corresponding task for end effector 116 to perform.

As further shown for the example in FIG. 5, the computer vision model may detect a symbol (e.g., a circle) and associate the symbol with start point identifier 510 and/or end point identifier 512. The computer vision model may distinguish between start point identifier 510 and end point identifier 512 based on a label (e.g., an alphanumeric character and/or the like) associated with the symbol. In the example shown, the computer vision model may be trained to detect and identify the circle with the numeric label as start point identifier 510, detect and identify the circle with the non-numeric label as end point identifier 512, and enable robot controller 110 to determine corresponding start and end points of the work path. If multiple path markers 504 are provided, robot controller 110 may determine a sequence by which to perform the associated task relative to another path marker 504 based on the numeric label of start point identifier 510.

Robot controller 110 may determine a set of coordinates within workspace 124 based on a work path identified by path marker 504. Robot controller 110 may use the computer vision model to spatially map a pixel coordinate system of vision system 106 with a coordinate system of workspace 124, and use the mapped pixel coordinates to determine coordinates for guiding end effector 116. For example, pixel coordinates of start point identifier 510 and/or end point identifier 512 in image 502 can be converted into three-dimensional coordinates corresponding to a location of start point identifier 510 and/or a location of end point identifier 512 within workspace 124. Robot controller 110 may similarly determine a set of coordinates corresponding to a location of work path identifier 506 and/or a location of task identifier 508, and interpolate the coordinates associated with work path identifier 506, task identifier 508, start point identifier 510, and/or end point identifier 512 to determine the work path. Additionally, or alternatively, vision system 106 may be used to spatially map the pixel coordinate system with a coordinate system of workspace 124.

As further shown in FIG. 5, robot controller 110 may generate an instruction, a command, and/or a program 514 of instructions and/or commands based on path marker 504. For example, based on attributes of path marker 504 determined from image 502, robot controller 110 may generate a work path instruction that can be used to guide robot 102 and end effector 116 during the operation. In particular, a work path instruction may instruct robot 102 to position end effector 116 at a start point (e.g., a corresponding location of start point identifier 510), and follow a work path (e.g., a corresponding location of work path identifier 506), and/or depart from workpiece 112 at an end point (e.g., a corresponding location of end point identifier 512). A work path instruction may instruct robot 102 to move end effector 116 to a start point of another work path (e.g., according to a sequence identified by start point identifier 510). In some examples, a work path instruction may instruct robot 102 to return to a home position after completing a work path and/or prior to beginning another work path.

Robot controller 110 may generate a task instruction that instructs end effector 116 to perform a particular task along a work path and/or at a corresponding location of task identifier 508. As shown for the example in FIG. 5, program 514 may include a task instruction to apply a particular weld schedule corresponding to the symbol (e.g., labeled pentagon) captured in image 502. The weld schedule may be selected from a plurality of preset weld schedules (e.g., stored in a data structure and/or the like), and each weld schedule may specify a set of weld parameters (e.g., a weld type, a weld size, a weave pattern, a wire feed speed, an end effector speed, and/or the like). A task instruction may instruct end effector 116 to begin the specified task (e.g., weld operation) at a corresponding location of start point identifier 510 and/or end the task at a corresponding location of end point identifier 512. In some cases, a task instruction may instruct end effector 116 to begin the task at a corresponding location of a first instance of task identifier 508 and/or end the task at a corresponding location of a final instance of task identifier 508.

As indicated above, FIG. 5 is provided as an example. Other examples may differ from what was described in connection with FIG. 5.

Figure 6:
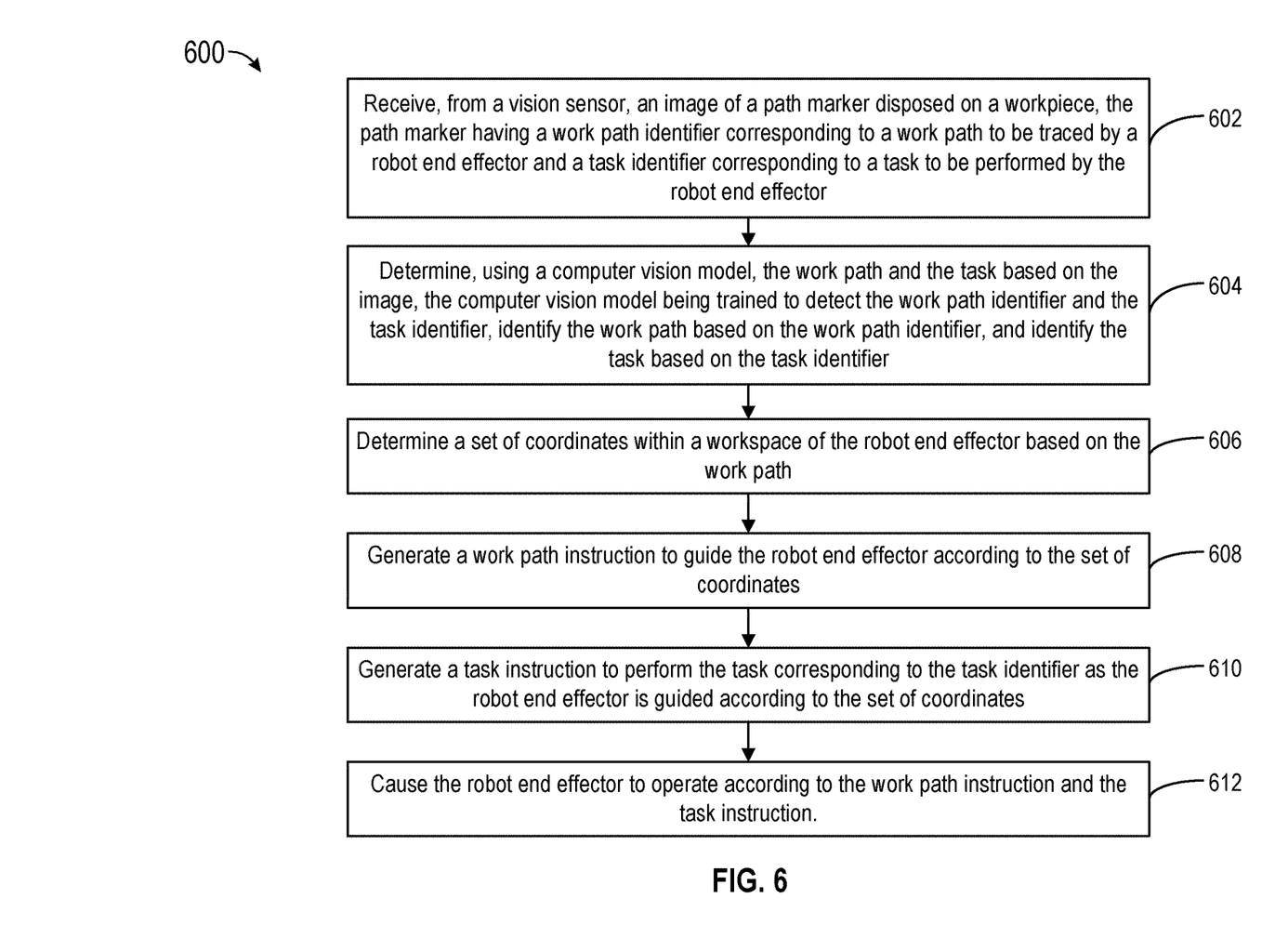
FIG. 6 is a flow chart of an example process for robot path planning using a robot system described herein.

FIG. 6 is a flow chart of an example process 600 for robot path planning using robot system 100 described herein. One or more process blocks of FIG. 6 may be performed by a robot controller (e.g., robot controller 110 of robot system 100) and/or by another component or a group of components separate from or including the robot controller (e.g., robot 102, positioner 104, vision system 106, and/or user interface device 108).

As shown in FIG. 6, process 600 may include receiving, from a vision sensor, an image of a path marker disposed on a workpiece, the path marker having a work path identifier corresponding to a work path to be traced by a robot end effector and a task identifier corresponding to a task to be performed by the robot end effector (block 602). For example, the robot controller (e.g., using processor 136, memory 138, communication device 140, and/or the like) may receive, from a vision sensor, an image of a path marker disposed on a workpiece, as described above. The path marker may have a work path identifier corresponding to a work path to be traced by a robot end effector and a task identifier corresponding to a task to be performed by the robot end effector.

As shown in FIG. 6, process 600 may include determining, using a computer vision model, the work path and the task based on the image, the computer vision model having been trained to detect the work path identifier and the task identifier, identify the work path based on the work path identifier, and identify the task based on the task identifier (block 604). For example, the robot controller (e.g., using processor 136, memory 138, communication device 140, and/or the like) may determine, using a computer vision model, the work path and the task based on the image, as described above. The computer vision model may have been trained to detect the work path identifier and the task identifier, identify the work path based on the work path identifier, and identify the task based on the task identifier.

As shown in FIG. 6, process 600 may include determining a set of coordinates within a workspace of the robot end effector based on the work path (block 606). For example, the robot controller (e.g., using processor 136, memory 138, and/or the like) may determine a set of coordinates within a workspace of the robot end effector based on the work path, as described above.

As shown in FIG. 6, process 600 may include generating a work path instruction to guide the robot end effector according to the set of coordinates (block 608). For example, the robot controller (e.g., using processor 136, memory 138, and/or the like) may generate a work path instruction to guide the robot end effector according to the set of coordinates, as described above.

As shown in FIG. 6, process 600 may include generating a task instruction to perform the task corresponding to the task identifier as the robot end effector is guided according to the set of coordinates (block 610). For example, the robot controller (e.g., using processor 136, memory 138, and/or the like) may generate a task instruction to perform the task corresponding to the task identifier as the robot end effector is guided according to the set of coordinates, as described above.

As shown in FIG. 6, process 600 may include causing the robot end effector to operate according to the work path instruction and the task instruction (block 612). For example, the robot controller (e.g., using processor 136, memory 138, communication device 140, and/or the like) may cause the robot end effector to operate according to the work path instruction and the task instruction, as described above.

Process 600 may include variations and/or additional implementations to those described in connection with FIG. 6, such as any single implementation or any combination of implementations described elsewhere herein. Although FIG. 6 shows example blocks of process 600, in some examples, process 600 may include additional blocks, fewer blocks, different blocks, or differently arranged blocks than those depicted in FIG. 6. Additionally, or alternatively, two or more of the blocks of process 600 may be performed in parallel.

INDUSTRIAL APPLICABILITY

A robot system can be used to facilitate a variety of tasks. For instance, a welding robot can be used to autonomously or semi-autonomously weld a workpiece. A robot system for welding includes a welding robot that is positioned relative to the workpiece within a respective workspace. The welding robot includes a manipulator (e.g., an articulated arm), an end effector (e.g., a welding tool), and a robot controller. The manipulator enables the robot to move the end effector to a desired position and/or orientation, and the robot controller controls the manipulator and the end effector according to weld instructions programmed by an operator. In some cases, the welding robot is aided by a positioner which movably supports the workpiece during a weld operation and a vision system which visually tracks progress of the weld operation. Although such automation can save time and resources that would otherwise be used to manually weld a workpiece, the process of programming the welding robot can be tedious, time consuming, and prone to errors.

The semi-autonomous robot path planning described herein enables a robot system to semi-autonomously learn a work path to trace, a task to be performed, and a sequence of work paths and/or tasks to follow with minimal time and input by an operator. For example, the present disclosure uses a path marker that is applied directly onto a workpiece and visually recognizable by a vision system associated with the robot system. The path marker can be removable and/or consumable (e.g., designed to be melted, dissolved, peeled, burned, and/or otherwise removed during a weld operation). The path marker includes a combination of work path identifiers, task identifiers, and/or other information that the vision system and/or the robot controller can detect, identify, and convert into instructions and/or commands for programming the robot controller. The respective program may also be displayed, simulated, or otherwise presented to an operator to enable the operator to edit or confirm the program prior to execution.

Accordingly, the present disclosure can save an operator or a programmer of a robot system a considerable amount of time that would otherwise be used to program the robot system. Significantly reducing the time spent to program the robot system conserves computational and network resources (e.g., processing resources, memory resources, power resources, communication resources, and/or the like) that would otherwise be used by an operator or a programmer. The present disclosure additionally leverages vision sensors of a vision system that is already available to many robot systems, thereby reducing the need for additional infrastructure to implement the present disclosure. Furthermore, the present disclosure can be implemented within a robot controller designed for a particular robot system, and/or easily implemented within a universal robot controller adapted for use with different types or brands of robot systems.

What is claimed is:

1. A method, comprising:
receiving, by a controller and from a vision sensor, an image of a path marker disposed on a workpiece,
the path marker having a work path identifier corresponding to a work path to be traced by a robot end effector and a task identifier corresponding to a task to be performed by the robot end effector, and
the path marker being in a form of an adhesive;
determining, by the controller and using a computer vision model, the work path and the task based on the image,
the computer vision model having been trained to detect the work path identifier and the task identifier, identify the work path based on the work path identifier, and identify the task based on the task identifier;
determining, by the controller, a set of coordinates within a workspace of the robot end effector based on the work path;
generating, by the controller, a work path instruction to guide the robot end effector according to the set of coordinates;
generating, by the controller, a task instruction to perform the task corresponding to the task identifier as the robot end effector is guided according to the set of coordinates; and
causing, by the controller, the robot end effector to operate according to the work path instruction and the task instruction.

2. The method of claim 1, wherein determining the work path and the task comprises:
detecting, using the computer vision model, the work path identifier and the task identifier based on the image of the path marker,
the computer vision model having been trained to distinguish between the path marker and the workpiece based on a visual contrast in the image, and distinguish between the work path identifier and the task identifier based on a visual pattern in the image.

3. The method of claim 1, wherein determining the work path and the task comprises:
determining, using the computer vision model, the task based on the image of the path marker,
the computer vision model having been trained to associate the task identifier in the image with one of a plurality of task identifiers, each of the plurality of task identifiers designating a respective weld operation to be performed by the robot end effector.

4. The method of claim 1, wherein determining the work path and the task comprises:
determining, using the computer vision model, the task based on the image of the path marker,
the computer vision model having been trained to associate the task identifier in the image with one of a plurality of task identifiers, each of the plurality of task identifiers designating a respective set of weld parameters, and
the set of weld parameters including one or more of a weld type, a weld size, a weave pattern, a wire feed speed, or an end effector speed.

5. The method of claim 1, wherein generating the work path instruction comprises:
generating one or more commands for the robot end effector to approach the workpiece from a robot home position, position the robot end effector at a start point of the work path, guide the robot end effector according to the work path until an end point of the work path is reached, and return the robot end effector to the robot home position.

6. The method of claim 1, wherein generating the task instruction comprises:
generating one or more commands for the robot end effector to perform a weld operation on the workpiece according to the set of coordinates,
the one or more commands specifying one or more of a weld type, a weld size, a weave pattern, a wire feed speed, or an end effector speed.

7. A robot controller, comprising:
one or more memories; and
one or more processors, communicatively coupled to the one or more memories, configured to:
receive, from a vision sensor, an image of a path marker disposed on a workpiece,
the path marker having a work path identifier corresponding to a work path to be traced by a robot end effector, and
the path marker being in a form of an adhesive;
determine, using a computer vision model, the work path based on the image,
the computer vision model having been trained to detect the work path identifier and identify the work path based on the work path identifier;
determine a set of coordinates within a workspace of the robot end effector based on the work path;
generate a work path instruction to guide the robot end effector according to the set of coordinates; and
cause the robot end effector to operate according to the work path instruction.

8. The robot controller of claim 7, wherein the one or more processors, when determining the work path, are configured to:
detect, using the computer vision model, the work path identifier based on the image of the path marker,
the computer vision model having been trained to distinguish between the path marker and the workpiece based on a visual contrast in the image, and identify the work path identifier based on a visual pattern in the image.

9. The robot controller of claim 7, wherein the one or more processors, when determining the work path, are configured to:
determine, using the computer vision model, the work path based on the image of the path marker,
the computer vision model having been trained to associate the work path identifier in the image with one of a plurality of work path identifiers, each of the plurality of work path identifiers designating a respective travel direction for the robot end effector.

10. The robot controller of claim 7, wherein the one or more processors, when determining the set of coordinates, are configured to:
determine coordinates corresponding to a start point of the work path;
determine coordinates corresponding to an end point of the work path; and
determine coordinates corresponding to one or more intermediate points between the start point and the end point.

11. The robot controller of claim 7, wherein the one or more processors, when generating the work path instruction, are configured to:
generate one or more commands for the robot end effector to approach the workpiece from a robot home position, position the robot end effector at a start point of the work path, guide the robot end effector according to the work path until an end point of the work path is reached, and return the robot end effector to the robot home position.

12. The robot controller of claim 7, wherein the image of the path marker further has a task identifier corresponding to a task to be performed by the robot end effector; and
wherein the one or more processors are further configured to:
determine, using the computer vision model, the task based on the image,
the computer vision model having been trained to detect the task identifier and identify the task based on the task identifier;
generate a task instruction to perform the task corresponding to the task identifier as the robot end effector is guided according to the set of coordinates; and
cause the robot end effector to operate according to the task instruction.

13. A system, comprising:
a robot configured to movably support an end effector;
a positioner configured to movably support a workpiece within a workspace of the robot;
a vision sensor configured to capture an image of the workspace and a path marker disposed on the workpiece,
the path marker being in a form of an adhesive; and
a robot controller in communication with the robot, the end effector, the positioner, and the vision sensor, the robot controller being configured to:
receive the image of the path marker from the vision sensor,
detect a work path identifier and a task identifier based on the image,
identify a work path to be traced by the end effector based on the work path identifier,
identify a task to be performed by the end effector based on the task identifier,
determine a set of coordinates within the workspace based on the work path,
generate a work path instruction to guide the end effector according to the set of coordinates,
generate a task instruction to perform the task corresponding to the task identifier, and
cause the robot and the end effector to operate according to the work path instruction and the task instruction.

14. The system of claim 13,
wherein the adhesive is a consumable adhesive that is configured to removably adhere to the workpiece, and
wherein the consumable adhesive is visually distinguishable from the workpiece.

15. The system of claim 13, wherein the robot controller, when detecting a work path identifier and a task identifier, is configured to:
detect, using a computer vision model, the work path identifier and the task identifier based on the image of the path marker,
the computer vision model having been trained to distinguish between the path marker and the workpiece based on a visual contrast in the image, and
distinguish between the work path identifier and the task identifier based on a visual pattern in the image.

16. The system of claim 13, wherein the robot controller, when identifying the work path, is configured to:
determine, using a computer vision model, the work path based on the image of the path marker,
the computer vision model having been trained to associate the work path identifier in the image with one of a plurality of work path identifiers, each of the plurality of work path identifiers designating a respective travel direction for the end effector.

17. The system of claim 13, wherein the robot controller, when identifying the task, is configured to:
determine, using a computer vision model, the task based on the image of the path marker,
the computer vision model having been trained to associate the task identifier in the image with one of a plurality of task identifiers, each of the plurality of task identifiers designating a respective set of weld parameters, and
the set of weld parameters including one or more of a weld type, a weld size, a weave pattern, a wire feed speed, or an end effector speed.

18. The system of claim 13, wherein the robot controller, when generating the work path instruction, is configured to:
generate one or more commands for the robot to approach the workpiece from a home position, position the end effector at a start point of the work path, guide the end effector according to the work path until an end point of the work path is reached, and return the end effector to the home position.

19. The system of claim 13, wherein the robot controller, when generating the task instruction, is configured to:
generate one or more commands for the robot to perform a weld operation on the workpiece according to the set of coordinates,
the one or more commands specifying one or more of a weld type, a weld size, a weave pattern, a wire feed speed, or an end effector speed.

20. The system of claim 13, further comprising a user interface device, the robot controller being in communication with the user interface device and further configured to:
provide a simulation result corresponding to the work path instruction and the task instruction via the user interface device, and
receive user input via the user interface device confirming the work path instruction and the task instruction.

* * * * *